United States Patent
Dabell et al.

(10) Patent No.: US 8,868,961 B1
(45) Date of Patent: Oct. 21, 2014

(54) METHODS FOR ACQUIRING HYPER TRANSPORT TIMING AND DEVICES THEREOF

(75) Inventors: Steven D. Dabell, Spokane, WA (US); C. Stuart Johnson, Liberty Lake, WA (US); Ronald Lee Steensland, Otis Orchards, WA (US)

(73) Assignee: F5 Networks, Inc., Seattle, WA (US)

( * ) Notice: Subject to any disclaimer, the term of this patent is extended or adjusted under 35 U.S.C. 154(b) by 524 days.

(21) Appl. No.: 12/613,806

(22) Filed: Nov. 6, 2009

(51) Int. Cl.
| G06F 1/12 | (2006.01) |
| G06F 13/42 | (2006.01) |
| G06F 5/00 | (2006.01) |
| G06F 7/00 | (2006.01) |
| H04L 25/00 | (2006.01) |
| H04L 7/00 | (2006.01) |

(52) U.S. Cl.
CPC . *H04L 7/00* (2013.01); *H04L 25/00* (2013.01)
USPC .......................................................... 713/400

(58) Field of Classification Search
CPC .......................................................... H04L 7/00
USPC .................................................. 713/400, 401
See application file for complete search history.

(56) References Cited

U.S. PATENT DOCUMENTS

| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |

(Continued)

FOREIGN PATENT DOCUMENTS

| EP | 0744850 A2 | 11/1996 |
| WO | WO 91/14326 | 9/1991 |

(Continued)

OTHER PUBLICATIONS

F5 Networks Inc., "Configuration Guide for Local Traffic Management," F5 Networks Inc., Jan. 2006, version 9.2.2, 406 pgs.

(Continued)

*Primary Examiner* — Mohammed Rehman
(74) *Attorney, Agent, or Firm* — LeClairRyan, a Professional Corporation

(57) ABSTRACT

A method, computer readable medium, system and apparatus that acquires data link timing includes sequentially introducing a delay and sampling data on a link after each sequentially introduced delay. A starting edge of a valid data eye and a trailing edge of the valid data eye during the sequentially introducing the delay and the sampling of the data is determined. The sequentially introduced delay when the starting edge of the valid data eye is detected and a subsequently introduced delay when the trailing edge of the valid data eye is detected are recorded. A bit sampling time that provides the timing for the sampling of data in the valid data eye between the sequentially introduced delay and the subsequently introduced delay is determined. By way of example, an optimum bit sampling time is determined as a mean from the transition of the starting edge of the valid data eye to the trailing edge of the valid data eye. The bit sampling time for the sampling of data is applied and the link is established.

28 Claims, 8 Drawing Sheets

(56) References Cited

U.S. PATENT DOCUMENTS

| | | |
|---|---|---|
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,411,986 B1 | 6/2002 | Susai et al. |
| 6,430,562 B1 | 8/2002 | Kardos et al. |
| 6,434,081 B1 * | 8/2002 | Johnson et al. .......... 365/233.14 |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,085,949 B2 * | 8/2006 | Mar et al. ..................... 713/400 |
| 7,113,993 B1 | 9/2006 | Cappiello |
| 7,139,792 B1 | 11/2006 | Mishra et al. |
| 7,228,422 B2 | 6/2007 | Morioka et al. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,590,882 B2 * | 9/2009 | Ferraiolo et al. .............. 713/600 |
| 7,624,424 B2 | 11/2009 | Morita et al. |
| 7,668,166 B1 | 2/2010 | Rekhter et al. |
| 7,680,915 B2 | 3/2010 | Still et al. |
| 7,724,657 B2 | 5/2010 | Rao et al. |
| 7,908,314 B2 | 3/2011 | Yamaguchi et al. |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,380,854 B2 | 2/2013 | Szabo |
| 8,447,871 B1 | 5/2013 | Szabo |
| 2001/0023442 A1 | 9/2001 | Masters |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0003287 A1 | 1/2004 | Zissimopoulos et al. |
| 2004/0103283 A1 | 5/2004 | Hornak |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 * | 3/2005 | Kim et al. ..................... 345/204 |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0262238 A1 | 11/2005 | Reeves et al. |

(56) References Cited

U.S. PATENT DOCUMENTS

| | | | |
|---|---|---|---|
| 2006/0031520 A1 | 2/2006 | Bedekar et al. | |
| 2006/0059267 A1 | 3/2006 | Cugi et al. | |
| 2006/0156416 A1 | 7/2006 | Huotari et al. | |
| 2006/0161577 A1 | 7/2006 | Kulkarni et al. | |
| 2006/0171365 A1 | 8/2006 | Borella | |
| 2006/0233106 A1 | 10/2006 | Achlioptas et al. | |
| 2006/0242300 A1 | 10/2006 | Yumoto et al. | |
| 2007/0016662 A1 | 1/2007 | Desai et al. | |
| 2007/0064661 A1 | 3/2007 | Sood et al. | |
| 2007/0083646 A1 | 4/2007 | Miller et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0220598 A1 | 9/2007 | Salowey et al. | |
| 2007/0297551 A1* | 12/2007 | Choi | 375/371 |
| 2008/0034136 A1 | 2/2008 | Ulenas | |
| 2008/0072303 A1 | 3/2008 | Syed | |
| 2008/0133518 A1 | 6/2008 | Kapoor et al. | |
| 2008/0134311 A1 | 6/2008 | Medvinsky et al. | |
| 2008/0148340 A1 | 6/2008 | Powell et al. | |
| 2008/0201599 A1* | 8/2008 | Ferraiolo et al. | 713/401 |
| 2008/0256224 A1 | 10/2008 | Kaji et al. | |
| 2008/0301760 A1 | 12/2008 | Lim | |
| 2009/0028337 A1 | 1/2009 | Balabine et al. | |
| 2009/0049230 A1 | 2/2009 | Pandya | |
| 2009/0119504 A1 | 5/2009 | van Os et al. | |
| 2009/0125625 A1 | 5/2009 | Shim et al. | |
| 2009/0138749 A1* | 5/2009 | Moll et al. | 713/503 |
| 2009/0141891 A1 | 6/2009 | Boyen et al. | |
| 2009/0228956 A1 | 9/2009 | He et al. | |
| 2009/0287935 A1 | 11/2009 | Aull et al. | |
| 2010/0071048 A1 | 3/2010 | Novak et al. | |
| 2010/0122091 A1 | 5/2010 | Huang et al. | |
| 2010/0150154 A1 | 6/2010 | Viger et al. | |
| 2010/0242092 A1 | 9/2010 | Harris et al. | |
| 2010/0251330 A1 | 9/2010 | Kroeselberg et al. | |
| 2010/0325277 A1 | 12/2010 | Muthiah et al. | |
| 2011/0040889 A1 | 2/2011 | Garrett et al. | |
| 2011/0047620 A1 | 2/2011 | Mahaffey et al. | |
| 2011/0173295 A1 | 7/2011 | Bakke et al. | |
| 2011/0273984 A1 | 11/2011 | Hsu et al. | |
| 2011/0282997 A1 | 11/2011 | Prince et al. | |
| 2011/0321122 A1 | 12/2011 | Mwangi et al. | |
| 2012/0066489 A1 | 3/2012 | Ozaki et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Crescendo Networks, "Application Layer Processing (ALP)," 2003-2009, pgs. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

Macvittie, Lori, "Message-Based Load Balancing," Technical Brief, Jan. 2010, pp. 1-9, F5 Networks, Inc.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report for International Patent Application No. PCT/US2013/026615 (Jul. 4, 2013).

\* cited by examiner

METHODS FOR ACQUIRING HYPER TRANSPORT TIMING AND DEVICES THEREOF

FIELD

The technology generally relates to computer system bus communications, and more particularly, to acquiring optimal data link timing for communicating over a system bus, such as a Hyper-Transport bus.

BACKGROUND

Communication technologies that link electronic devices are many and varied, servicing communications via both physical media and wirelessly.

Some communication technologies interface a pair of devices, other communication technologies interface small groups of devices, and still other communication technologies interface large groups of devices. Examples of communication technologies that couple small groups of devices include buses within computers, e.g., PCI (peripheral component interface) bus, ISA (industry standard architecture) bus, USB (universal serial bus), and SPI (system packet interface).

One communication technology for coupling relatively small groups of devices or components is the HyperTransport (HT) technology, previously known as the Lightning Data Transport technology (HyperTransport I/O Link Specification "HT Standard"), which is a data packet-based communication protocol for data transfer over buses. There are currently three versions of HT, with current AMD® Opteron® processors adhering to the HT 2.0b specification, for example. Generally, the HT specifications set forth definitions for a high-speed, low-latency protocol that can interface with other buses like AGP, AGP 8x, PCI, PCI-X, SPI, 1394 (Firewire), USB 2.0, Infiniband, or 1 and 10 Gb Ethernet, for example.

HT interconnects provide high-speed data links between coupled components. Most HT enabled components include at least a pair of HT ports so that HT enabled components may be daisy-chained. In an HT chain or fabric, each coupled component may communicate with each other coupled component using appropriate addressing and control. By way of example, HT generally is used to connect AMD® processors to other AMD® processors or bridge devices.

Many server computers employ HT protocol bus architectures to provide connectivity between the server host system processors and peripheral components. Currently, a bus implementing the Hyper-Transport protocol can be used to potentially transfer data at speeds anywhere from 200 MHz to 3.2 Ghz, depending on the Hyper-Transport protocol version and a number of other factors. The particular speed which is utilized is negotiated during system boot time and is limited by the speed capabilities of the connected device or peripheral. Since a server's overall performance can be limited by the bus speed, it is desirable to operate this bus at the maximum possible speed.

The primary challenge in utilizing the maximum or optimal speed achievable over HT buses is establishing very accurate timing for sampling of the data in the center of the data eye. The HT protocol does not provide any provisions for establishing accurate timing during negotiation of the link. As a result, achieving accurate sampling timing is very challenging at frequencies greater than about 400 MHz because of various factors, such as temperature and voltage variations.

SUMMARY

A method for acquiring data link timing includes sequentially introducing a delay and sampling data on a link after each sequentially introduced delay with an application delivery controller. The application delivery controller determines a starting edge of a valid data eye and a trailing edge of the valid data eye during the sequentially introducing the delay and the sampling of the data. The sequentially introduced delay when the starting edge of the valid data eye is detected and a subsequently introduced delay when the trailing edge of the valid data eye is detected are recorded with the application delivery controller. A bit sampling time that provides the timing for sampling of data in the valid data eye between the sequentially introduced delay and the subsequently introduced delay is determined with the application delivery controller. By way of example, an optimum bit sampling time is determined as a mean from the transition of the starting edge of the valid data eye to the trailing edge of the valid data eye. The bit sampling time is applied and the link is established with the application delivery controller.

A computer readable medium having stored thereon instructions for acquiring data link timing comprising machine executable code which when executed by at least one processor, causes the processor to perform steps including sequentially introducing a delay and sampling data on a link after each sequentially introduced delay. A starting edge of a valid data eye and a trailing edge of the valid data eye during the sequentially introducing the delay and the sampling of the data is determined. The sequentially introduced delay when the starting edge of a valid data eye is detected and a subsequently introduced delay when the trailing edge of the valid data eye is detected are recorded. A bit sampling time that provides the timing for the sampling of data in the valid data eye between the sequentially introduced delay and the subsequently introduced delay is determined. By way of example, an optimum bit sampling time is determined as a mean from the transition of the starting edge of the valid data eye to the trailing edge of the valid data eye. The bit sampling time for the sampling of data is applied and the link is established.

A data link timing acquisition system includes a data tap management system and a timing acquisition processing system in an application delivery controller. The data tap management system sequentially introduces a delay and samples data on a link after each sequentially introduced delay. The timing acquisition processing system records the sequentially introduced delay when a first unstable region, i.e. not in the valid data eye, is detected during the sampling the data and a subsequently introduced delay when a second unstable region is detected during the sampling the data. The first unstable region is separated from the second unstable region by a valid data eye. The timing acquisition processing system determines a bit sampling time that provides the timing for the sampling of data in the valid data eye between the sequentially introduced delay and the subsequently introduced delay, applies the bit sampling time, and establishes the link. By way of example, the timing acquisition system determines an optimum bit sampling time as a mean from the transition of the starting edge of the valid data eye to the trailing edge of the valid data eye.

An application delivery controller apparatus includes one or more host system processors, a host system memory coupled to the one or more host system processors, and a network interface unit coupled to the one or more host system processors and the host system memory via at least one bus utilizing a Hyper-Transport protocol. At least one of the network interface unit with logic configured to implement and the one or more host system processors configured to execute programmed instructions stored in the host memory system including sequentially introducing a delay and sampling data on a link after each sequentially introduced delay. A starting edge of a valid data eye and a trailing edge of the valid data eye during the sequentially introducing the delay and the sampling of the data is determined. The sequentially introduced delay when the starting edge of a valid data eye is detected and a subsequently introduced delay when the trailing edge of the valid data eye is detected are recorded. A bit sampling time that provides the timing for the sampling of data in the valid data eye between the sequentially introduced delay and the subsequently introduced delay is determined. By way of example, an optimum bit sampling time is determined as a mean from the transition of the starting edge of the valid data eye to the trailing edge of the valid data eye. The bit sampling time for the sampling of data is applied and the link is established.

The bus timing acquisition technology enables at or near optimal timing for sampling of the data on a bus utilizing the Hyper-Transport protocol to be achieved. Once the optimum timing is acquired and loaded, no further changes are required. Additionally, this Hyper-Transport timing acquisition technology is compatible with the existing Hyper-Transport protocol and does not require any system modifications. Further, this Hyper-Transport timing acquisition technology takes advantage of the periodic Hyper-Transport Cyclic Redundancy Check (CRC) sequence to iteratively determine the optimum sample timing to the center of the received data eye so that the Hyper-Transport bus can achieve reliable operation at much higher frequencies than previously was possible. This Hyper-Transport timing acquisition technology also enables ASICs, FPGAs and other devices which implement the Hyper-Transport bus protocol and other applicable bus protocols to operate at higher bus speeds than might otherwise be achievable utilizing prior known techniques.

DETAILED DESCRIPTION

Figure 1:
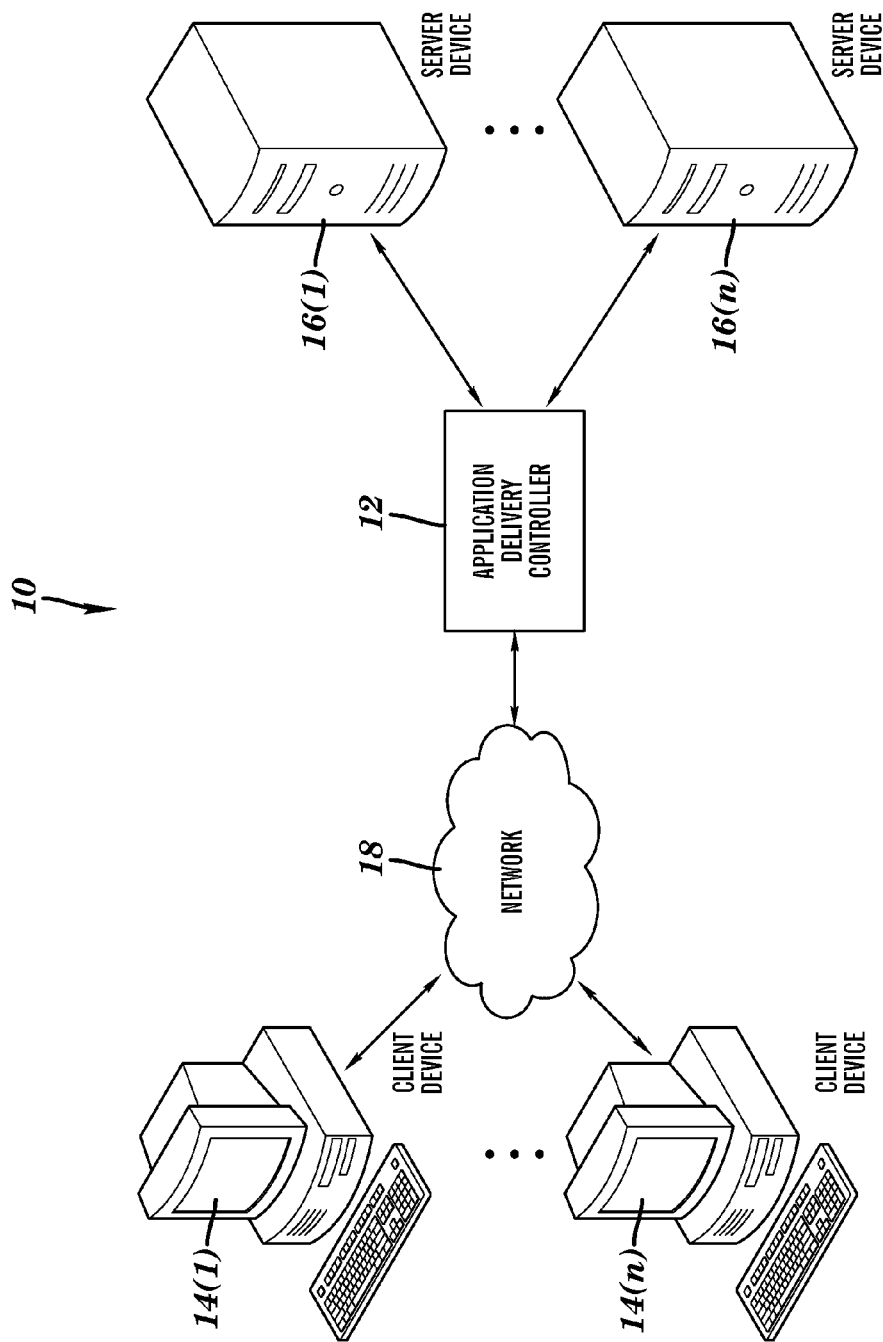
FIG. 1 is an exemplary network environment in which data link timing is acquired.

An exemplary network environment 10 in which data link timing is acquired, such as for a computer system bus employing the HyperTransport bus protocol, is illustrated in FIG. 1. The exemplary network environment 10 includes an application delivery controller 12, client computing devices 14(1)-14(n), server devices 16(1)-16(n), and a communication network 18, although the environment could include other types and numbers of systems, devices, blades, components, elements, and communication networks in other configurations.

Generally, the application delivery controller 12, utilizing the data link timing acquisition methods described herein, facilitates network communications between one or more of the client computing devices 14(1)-14(n) and one or more of the server devices 16(1)-16(n). Among other advantages, the data link timing acquisition technology enables at or near optimal timing for sampling of the data on a bus utilizing the Hyper-Transport protocol to be achieved.

Figure 2:
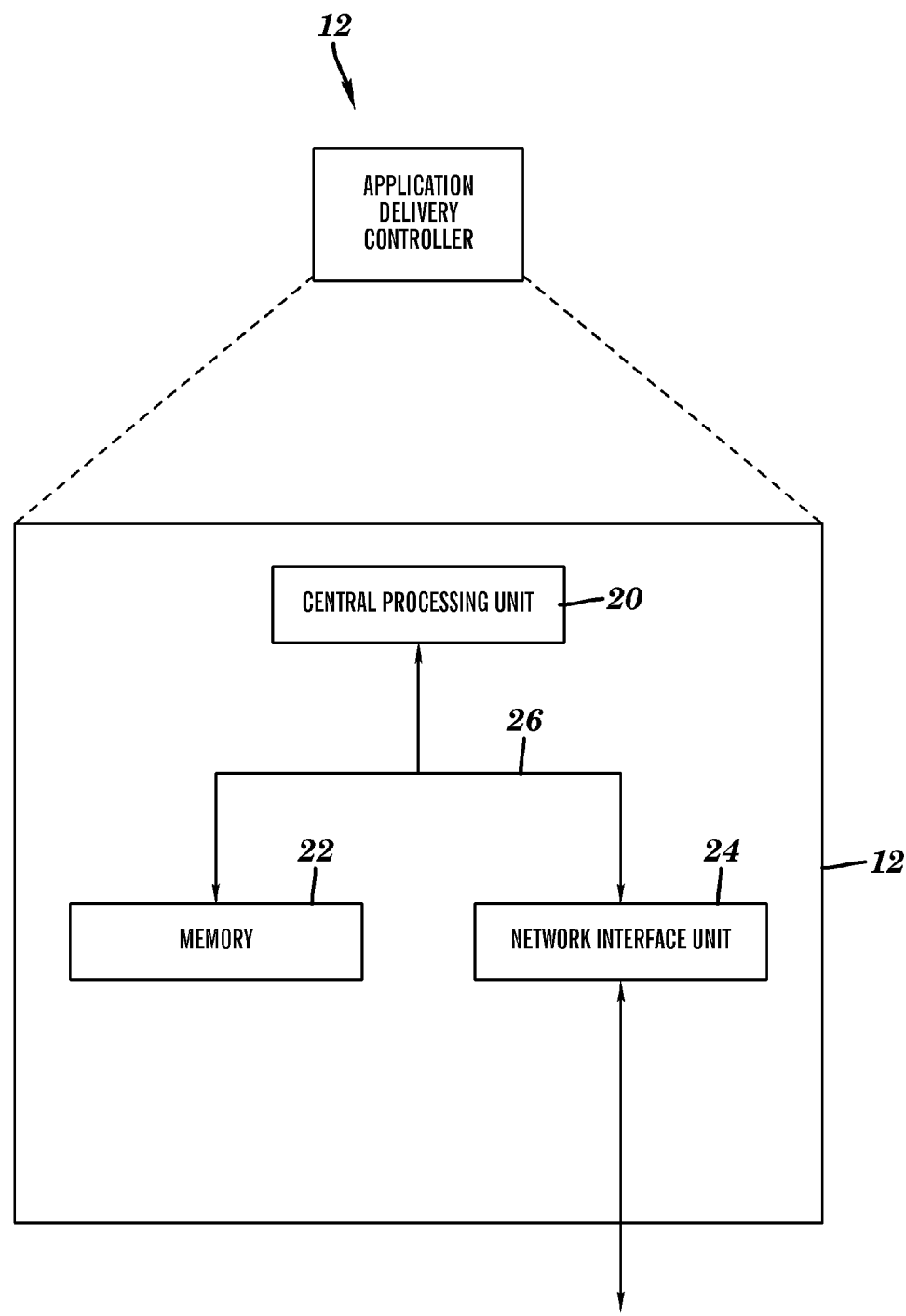
FIG. 2 is a block diagram of an application delivery controller in the exemplary network environment.
Figure 3:
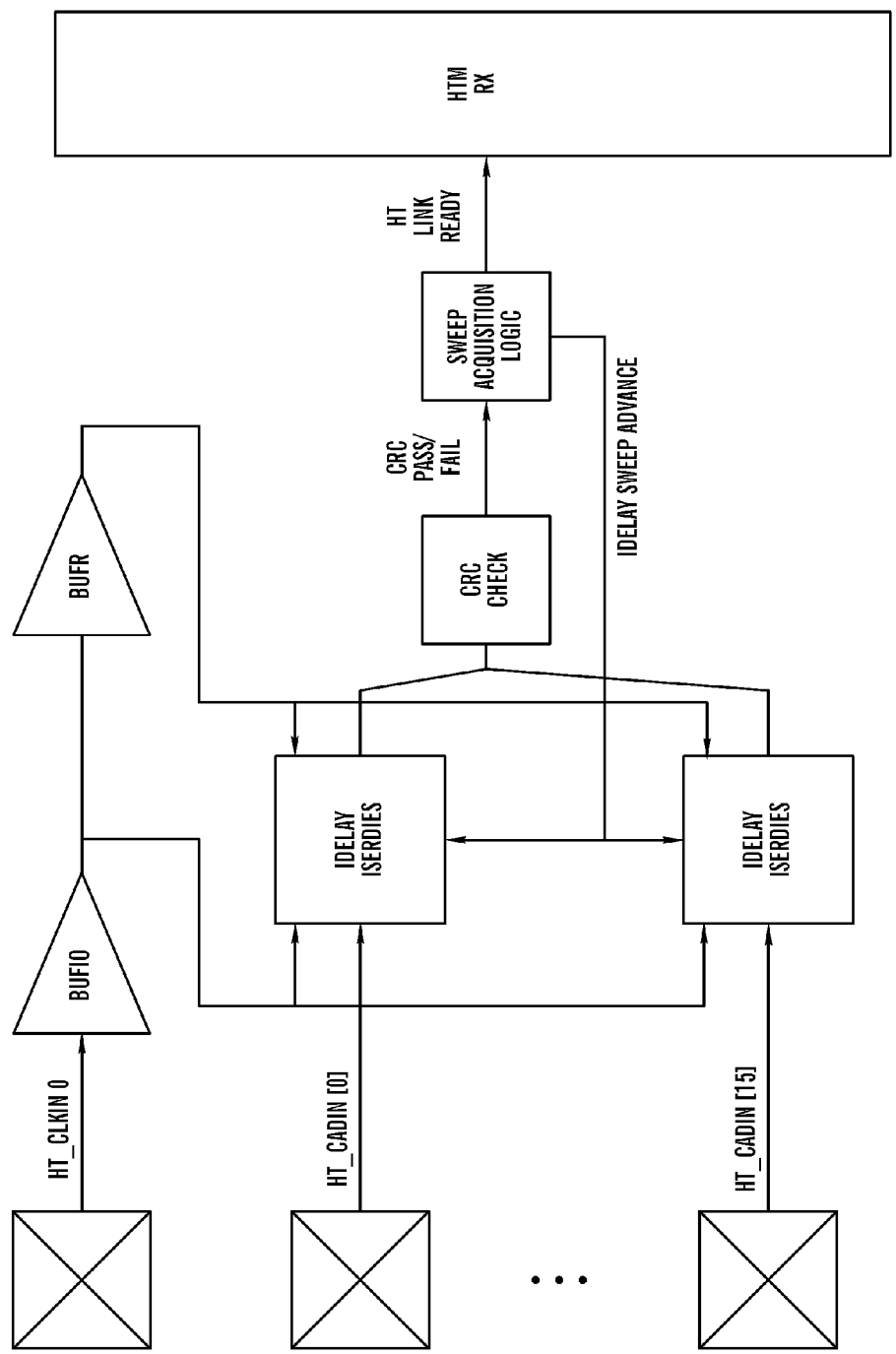
FIG. 3 is a partial block and partial flow diagram of a portion of a network interface unit in the application delivery controller.
Figure 4:
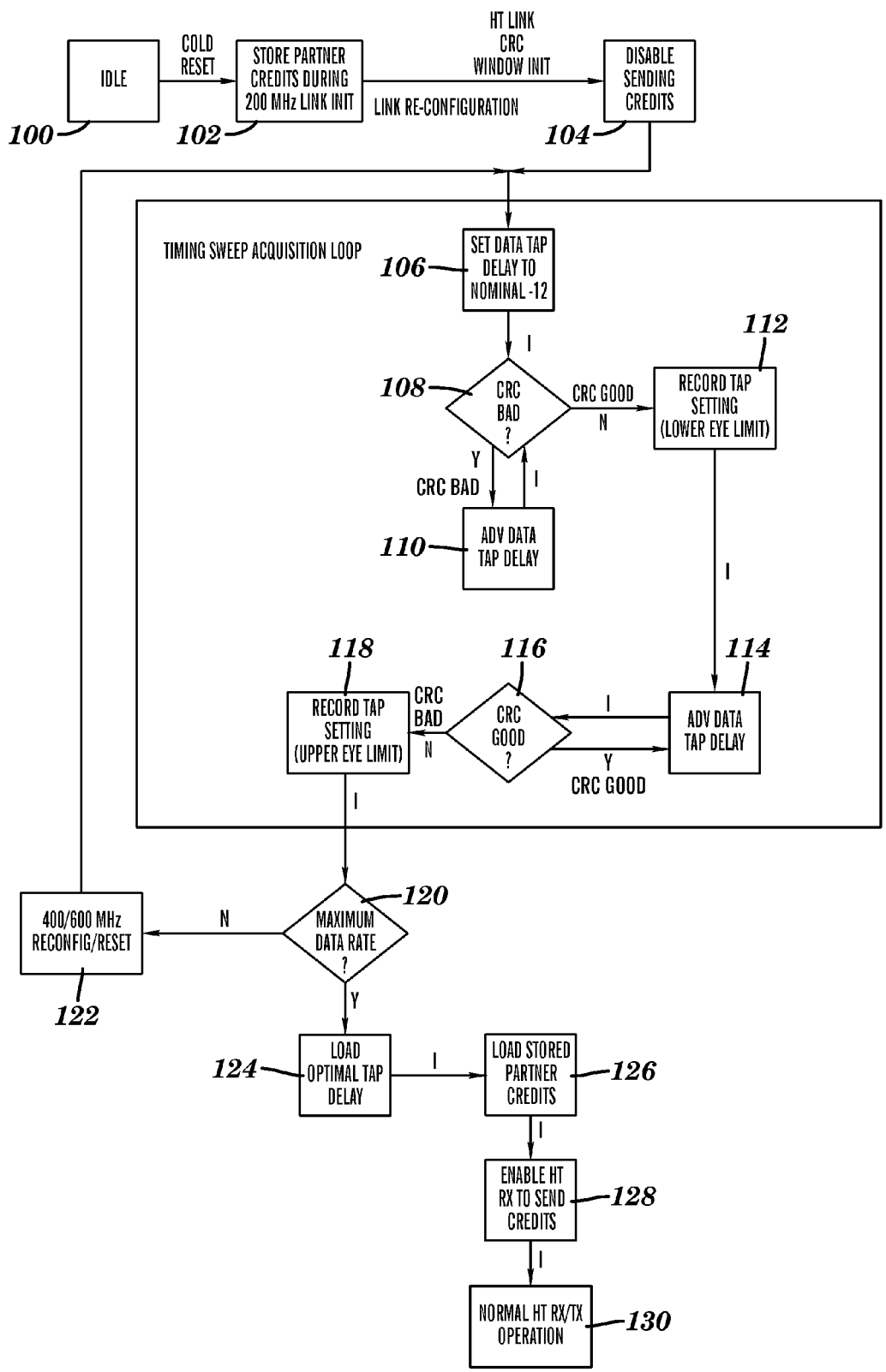
FIG. 4 is a flow chart of a method for acquiring data link timing with the application delivery controller shown in FIGS. 1-3.

Referring more specifically to FIGS. 1-3, the application delivery controller 12 includes at least one central processing unit (CPU) or processor 20, at least one memory 22 and at least one network interface unit 24, which are coupled together by a bus 26 or other numbers and types of links, although the controller 12 may include other components and elements in other configurations. In this example, the bus 26 utilizes the Hyper-Transport protocol and comprises a link with sixteen discrete physical lanes HT_CADIN[0]-HT_CADIN[15], along with a clock signal HT_CLKIN as shown in greater detail in FIG. 3, although the bus 26 could comprise other numbers and types of links and elements (e.g., HT_PWROK and HT_RESET#), and utilize other types of protocols.

The HT protocol implemented on bus 26 may conform to any of the HT specification versions, such as the HyperTransport™ I/O Link Specification, Revision 2.0b, Document # HTC20031125-0035-0009, published by the HyperTransport Technology Consortium, Apr. 27, 2005, and example implementations of the HT protocol are disclosed in U.S. Pat. No. 7,549,091, entitled "Hypertransport Exception Detection and Processing," issued Jun. 16, 2009 to Rowlands, et al.; U.S. Pat. No. 7,117,308, entitled "Hypertransport Data Path Protocol," issued Oct. 3, 2006 to Mitten, et al.; and U.S. Pat. No. 7,111,092, entitled "Buffer Management Technique for a Hypertransport Data Path Protocol," issued Sep. 19, 2006 to Mitten, et al., each of which is incorporated herein by reference in its entirety.

The central processing unit (CPU) or processor 20 executes a program of stored instructions for one or more aspects of the technology as described herein, including, by way of example only, at least a portion of the methods for acquiring bus timing described herein. The memory 22 stores these programmed instructions for execution by the processor 20 to perform one or more aspects of the technology as described herein, although some or all of the programmed instructions could be stored and/or executed elsewhere. A variety of different types of memory storage devices can be used for the memory 22, such as random access memory (RAM), read only memory (ROM) in the system, floppy disk, hard disk, CD ROM, DVD ROM or other computer readable medium read from and/or written to by a magnetic, optical, or other reading and/or writing controllers/systems coupled to the processor 20, and combinations thereof.

In this example, the network interface unit 24 is a field programmable gate array that may include a local memory and be configured with logic to implement one or more aspects of the technology, including by way of example only, acquiring a bus clock signal and a sixteen bit data stream from the bus 26, sequentially introducing delay and sampling data from the data bit stream, conducting a cyclical redundancy check or other error check on the sampled data, identifying an unstable region and a valid data eye or window in the sampled data, and determining a bit sampling time for sampling data in the data bit stream in the valid data eye, although the network interface unit 24 can comprise other types of configurable hardware and may include other components and elements configured in other manners which could implement one or more aspects of the technology.

Each of the client computing devices 14(1)-14(n) and server devices 16(1)-16(n) includes a central processing unit (CPU) or processor, a memory, and an interface or I/O system, which are coupled together by a bus or other link, although other numbers and types of network devices could be used.

The communication network 18 is a public data/communication network, such as a TCP/IP network by way of example only, which may include one or more other types and numbers of communication networks employing a variety of communications protocols, although other types of networks and protocols could be used.

Although an exemplary environment 10 with the application delivery controller 12, the client computing devices 14(1)-14(n), the server devices 16(1)-16(n), and the communication network 18 are described and illustrated herein, other types and numbers of systems, devices, blades, components, and elements in other configurations can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for acquiring data link timing in the application delivery controller 12 will now be described with reference to FIGS. 1-4. It should be noted that some steps are described in the ensuing description as being performed by certain components of the application delivery controller 12, such as the network interface unit 24, for exemplary purposes only. It should be understood and appreciated, however, that other components of the controller 12 could perform these steps and in other orders and sequences.

As such, in step 100, the network interface unit 24 in the application delivery controller 12, for example, initially remains in an idle state until a reset indication is received from either one of the client computing devices 14(1)-14(n), such as by an administrative user of the client devices accessing the controller 12 via a local area network connection, although other manners for initiating can be used, including the server devices 16(1)-16(n) or directly accessing an interface on the controller 12 itself to initiate the restart (e.g., restart, power or reset button).

In step 102, when the reset indication is received by the network interface unit 24 in the application delivery controller 12, for example, a bus communication link is initialized at a starting data rate, such as 200 MHz, in a sixteen bit mode between the bus 26 and the network interface unit 24, although the link can be initialized in other manners and at other frequencies with other numbers of bits, such as with eight bits, by way of example only. As part of the initialization, the application delivery controller 12 receives and stores partner issued credits in memory 22 for later use during re-negotiation once the timing has been acquired, although the credits can be stored elsewhere.

In step 104, the application delivery controller 12 initializes the cyclic redundancy check (CRC), although other manners for identifying a transmission error could be used. Additionally, the application delivery controller 12 disables issuance of the partner issued credits so the link is not established until the Hyper-Transport bus timing has been acquired as described herein.

In step 106, the network interface unit 24 initializes a data tap delay to a minimum input delay, such as 75 picoseconds, although other delays and other manners for obtaining an initial or starting data tap delay can be used, such as determining an acquired data tap delay for an initial data rate and using this acquired tap delay as the starting data tap delay for acquiring another data tap delay for a second higher data rate by way of example only. When the clock signal HT_CLKIN goes high, the initialized or starting data tap delay is applied at IDELAY for each of the physical lanes HT_CDIN[0]-HT_CADIN[15] and then the data is sampled at the output of the IDELAY for each of the physical lanes HT_CDIN[0]-HT_CADIN[15].

In step 108, the network interface unit 24 conducts a CRC check on the sampled data from physical lanes HT_CDIN[0]-HT_CADIN[15], although other types of data checks could be used. If in step 108, the network interface unit 24 determines the CRC for the sampled data from physical lanes HT_CDIN[0]-HT_CADIN[15] is either good without a prior bad CRC or is bad, then the No branch is taken to step 110.

In step 110, the network interface unit 24 advances the current data tap delay by one tap of about 75 picoseconds in this particular example, although the amount the data tap delay is advanced, or declined, can vary as needed for the particular application. Once the current data tap delay has been advanced, the network interface unit 24 samples the data on each of the physical lanes HT_CDIN[0]-HT_CADIN[15] and then the method returns to step 108 for another CRC or other error check as described above, although the data can be sampled in other manners.

If in step 108, the network interface unit 24 determines the CRC is good with at least one prior bad CRC, then the Yes branch is taken to step 112. In step 112, the network interface unit 24 records the current data tap delay which was applied as the lower limit of a valid input delay to a valid data eye for sampling data from physical lanes HT_CDIN[0]-HT_CADIN[15], although this current data tap delay could be recorded at other locations and other manners for determining an edge or start of the valid data eye can be used.

In step 114, the network interface unit 24 advances the recorded current data tap delay by one tap of about 75 picoseconds in this particular example, although the amount the data tap delay is advanced, or declined, can vary as needed for the particular application. Once the current data tap delay has been advanced, the network interface unit 24 again samples the data on each of the physical lanes HT_CDIN[0]-HT_CA-DIN[15] for another CRC or other error check in step 116, although the data can be sampled in other manners.

In step 116, the network interface unit 24 conducts the cyclic redundancy check (CRC) on the sampled data from physical lanes HT_CDIN[0]-HT_CADIN[15]. If in step 116, the network interface unit 24 determines the CRC for the sampled data from physical lanes HT_CDIN[0]-HT_CADIN[15] is good, then the Yes branch is taken back to step 114 as described above.

If in step 116, the network interface unit 24 determines the CRC is bad, then the No branch is taken to step 118. In step 118, the network interface unit 24 records the current data tap delay which was applied as the upper limit for sampling data from physical lanes HT_CDIN[0]-HT_CADIN[15], although this current data tap delay could be recorded at other locations and other manners for determining an edge or end of the valid data eye or stable region can be used.

In step 120, the application delivery controller 12 determines whether the maximum data rate capability for the application delivery controller 12 has been reached, although other manners for determining whether to try a higher data rate can be used. By way of example only, if the maximum data rate capability was 400 MHz or 600 MHz, an initial determination at 200 MHz would trigger moving to the maximum data rate for the application delivery controller 12 stored in memory, although other increments above the initial data rate and below the maximum data rate could be used. As such, if in step 120, the application delivery controller 12 determines the maximum data rate capability has not been reached, then the NO branch is taken to step 122. If in step 120, however, the application delivery controller determines the maximum data rate capability has been reached, then the Yes branch is taken to step 124.

In step 122, the current data rate is stepped up to the maximum data rate capability for the application delivery controller 12, such as 400 MHz in this example, although other step values and other manners for increasing or obtaining a higher data rate can be used. Next, the process returns to step 106 where the acquired timing at the first data rate of 200 MHz is now used as the starting data tap delay at the new data rate of 400 MHz so the data initially is sampled data in a stable region.

In step 124, following the network interface unit 24 determining a higher data rate should not be used, the unit 24 determines the acquired data tap delay by taking the mean of the recorded upper and lower limits for the data tap delay determined at steps 112 and 118, for example, although another data tap delay between the recorded upper and lower limits could be used and other manners for determining the acquired data tap delay can be used. The network interface unit 24 loads the acquired data tap delay for sampling data at the current data rate.

In step 126, since the bus timing has been acquired, the application delivery controller 12 loads the credits that were previously stored back at step 102, and the process proceeds to step 128.

In step 128, the application delivery controller 12 enables sending the loaded credits and then in step 130 the data bus communication link is established. Accordingly, with the bus timing acquired at or near optimal timing for sampling of the data on the bus, utilizing the Hyper-Transport protocol can now be achieved. Additionally, once this optimum Hyper-Transport timing is acquired and loaded as illustrated in the examples herein, no further changes are required.

Figure 5:
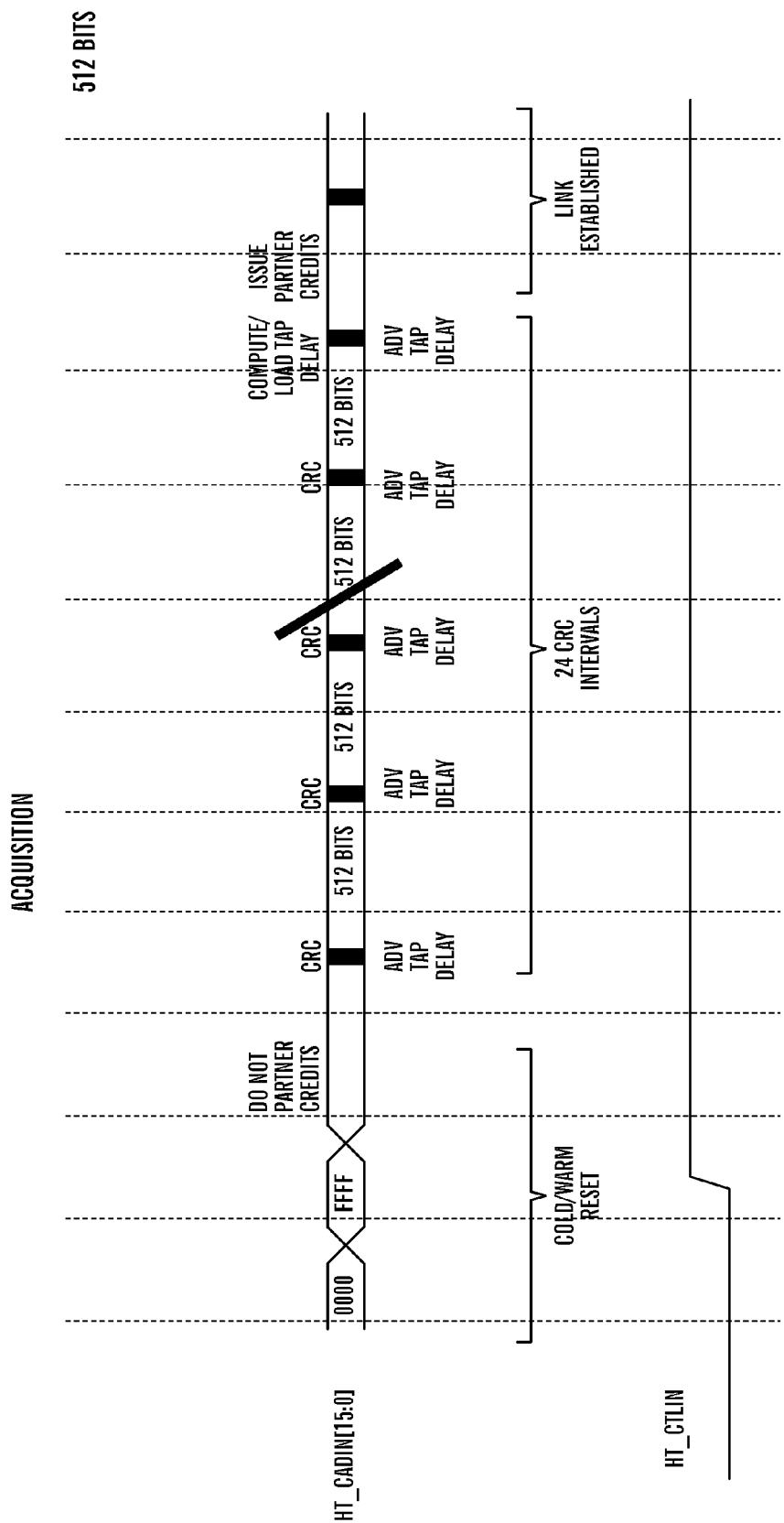
FIGS. 5-8 are timing diagrams illustrating the data link timing acquisition.

By way of example only, the timing diagram in FIG. 5 illustrates the initial reset, the initial and sequential advancement of the data tap delay, the CRC checks and the eventual establishment of the link.

Figure 6:
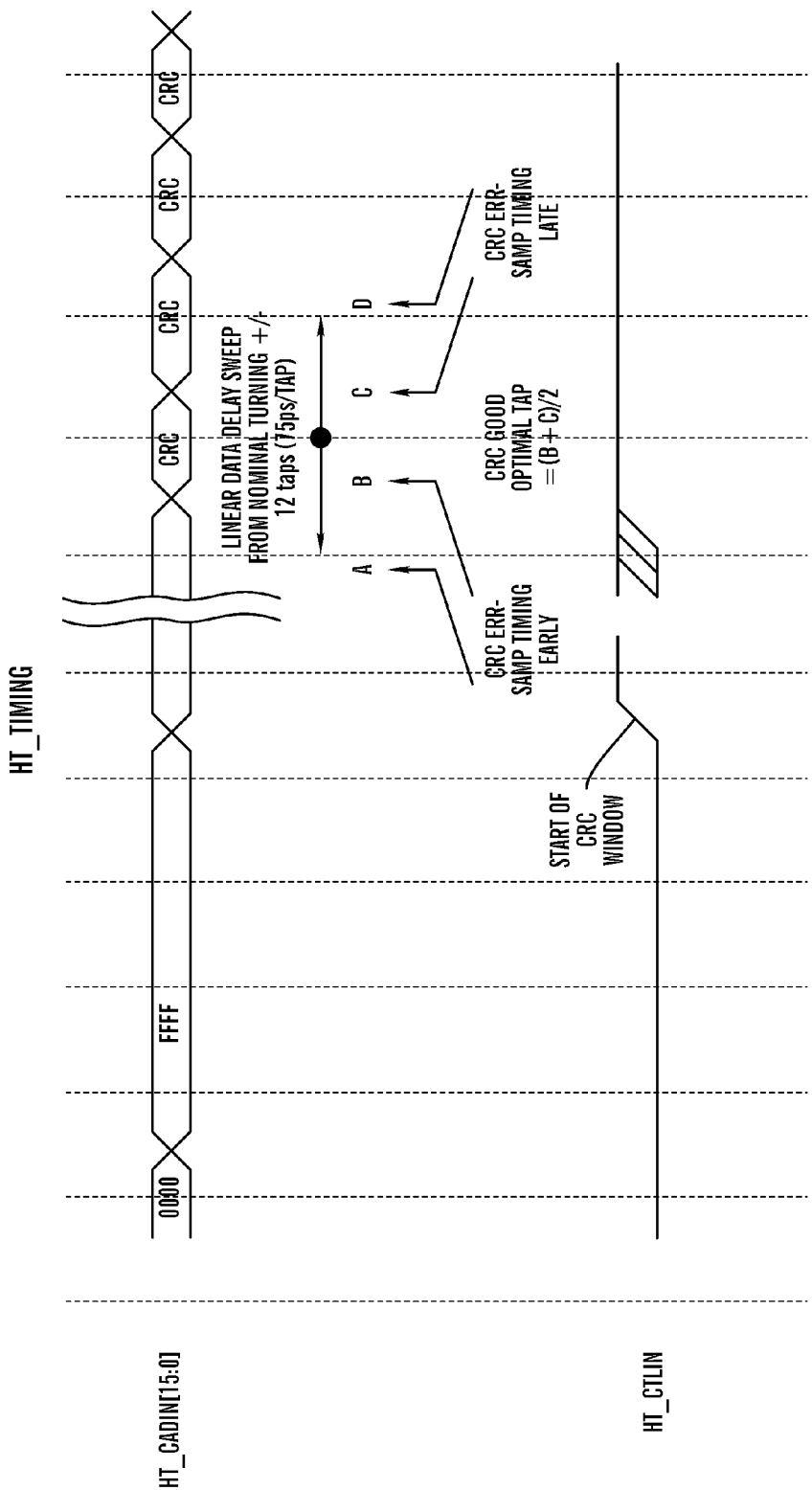

Referring to FIG. 6, an example where the data on the bus utilizing the Hyper-Transport protocol happens to align perfectly with respect to the sampling clock is illustrated. As is shown, the input is discretely swept over just greater than twice the variance of the timing uncertainty. In this example, this is approximately 800 picoseconds. Also in this example, the input tap delay resolution is 75 ps thus approximately +/−12 taps of sweeps as described in the flow chart above are used to determine the lower and upper limits and the optimum data tap delay for the sampling of the data.

The points marked A, B, C, and D in the timing diagram shown in FIG. 6 represent the locations of sweep delay boundaries. Points A and D represent the maximum endpoints of the sweep delay. Points B and C frame the valid data eye or the stable region for sampling data and represent input tap delays which resulted in valid sampling during the Hyper-Transport timing acquisition. In this example, the optimum sampling point is the mean of tap delay represented by each of the points B and C, although other locations between points B and C could be used as the optimum sampling point.

Figure 7:
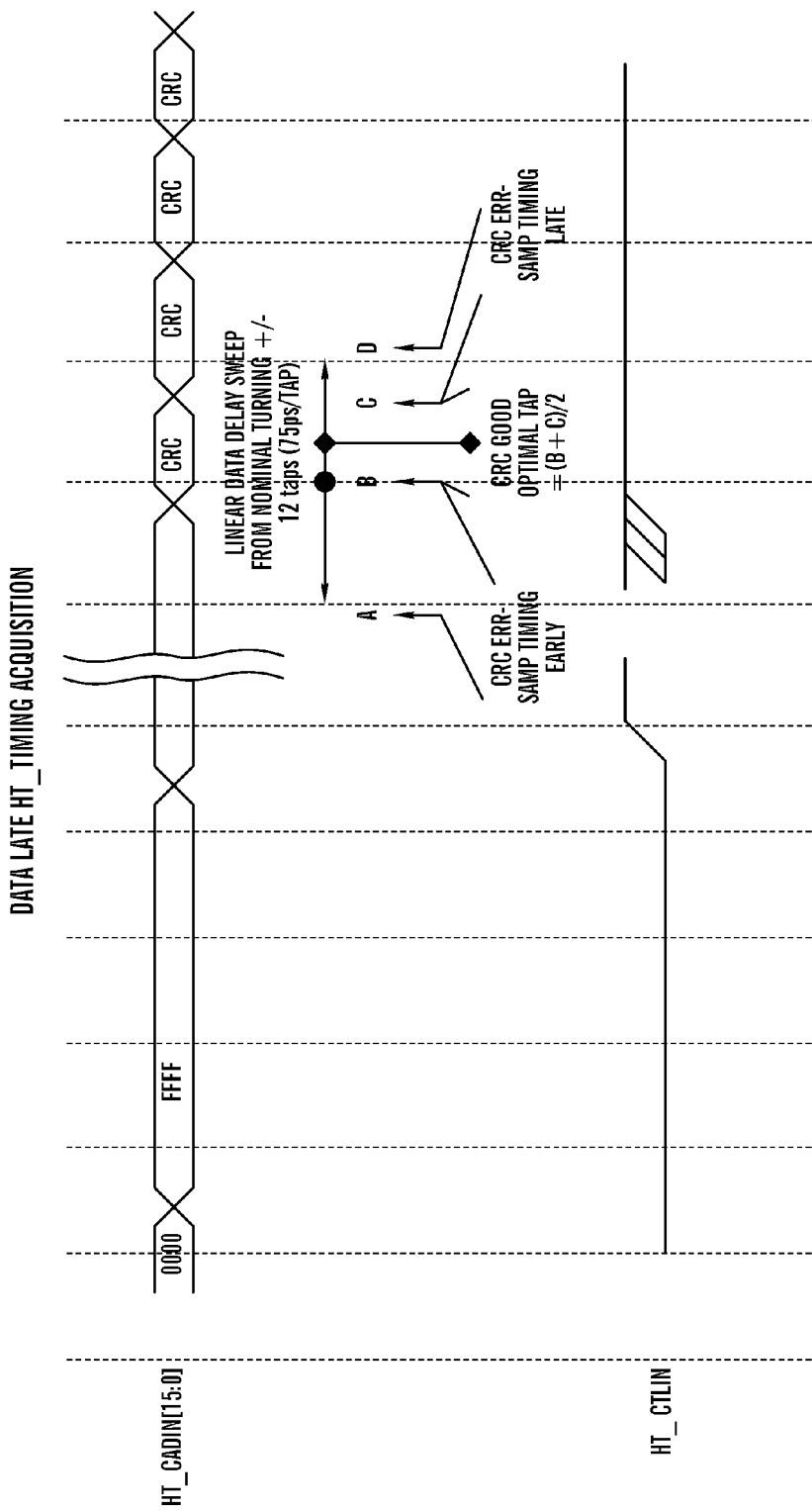
Figure 8:
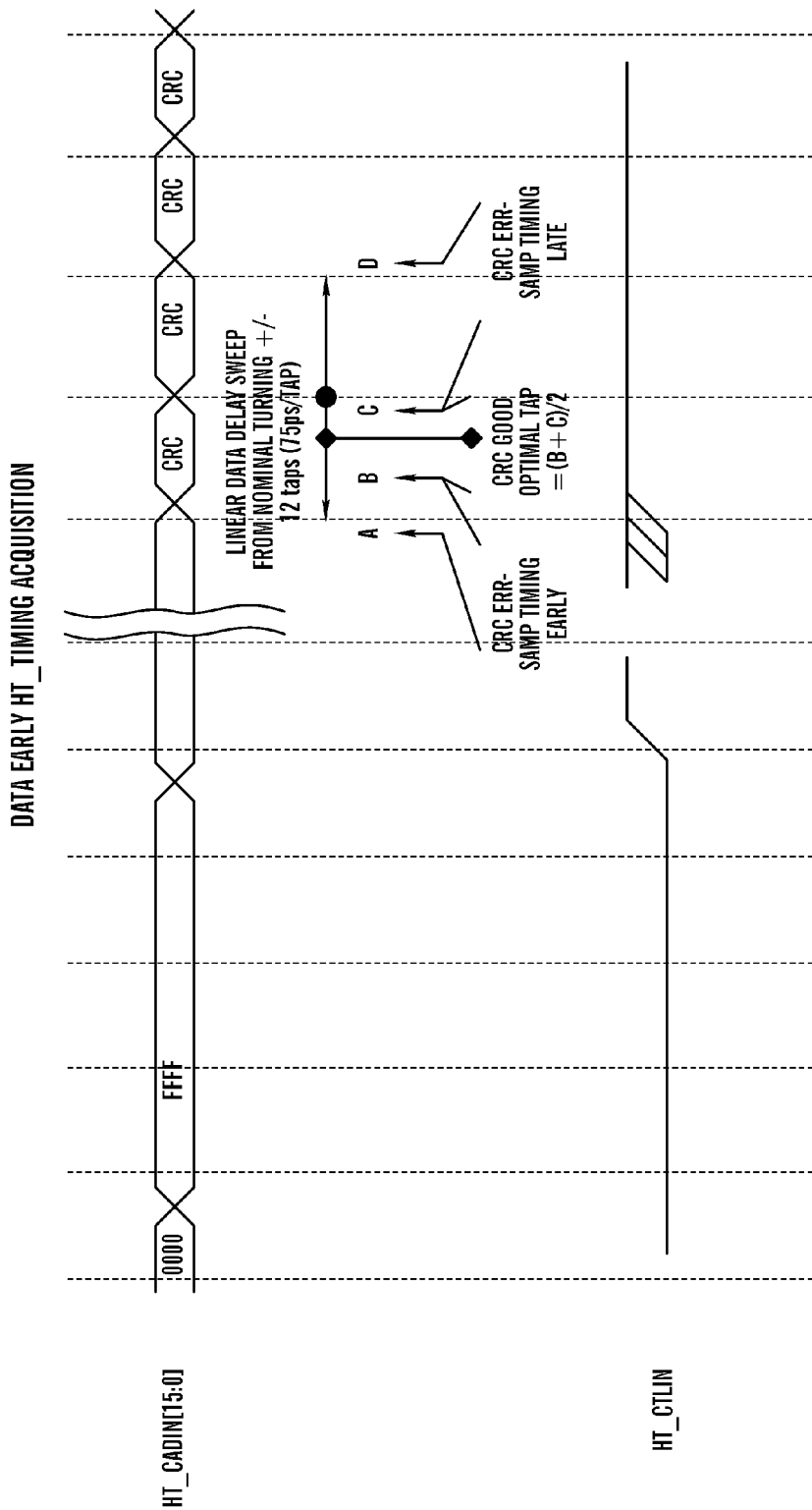

Referring to FIGS. 7 and 8, the illustrated timing diagrams represent the same example as shown in FIG. 6, except the data on the bus utilizing the Hyper-Transport protocol is either too slow or too fast with respect to the sampling clock. Again in these other examples, the discrete input delay sweep will extract the points B and C from which the optimum sampling point again is the mean of tap delay represented by each of the points B and C, although other locations between points B and C could be used as the optimum sampling point.

Accordingly, as illustrated and described herein, this data bus timing acquisition method, which is applicable to buses employing the Hyper-Transport protocol, for example, enables obtaining the optimal input data sampling point allowing reliable operation of the bus at higher frequencies than previously was possible. Although these methods have been described in the context of the Hyper-Transport bus protocol, it should be appreciated that these teachings may be equally applicable to other buses and protocols without departing from the spirit and scope of these teachings.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for acquiring data link timing, the method comprising:
   sequentially introducing a delay and sampling data on a link after each sequentially introduced delay with an application delivery controller;
   determining with the application delivery controller a starting edge of a valid data eye and a trailing edge of the valid data eye during the sequentially introducing the delay and sampling data, wherein the determining the starting edge and the trailing edge further comprises performing an error calculation cyclic redundancy check on the sampled data to detect the starting edge of the valid data eye and the trailing edge of the valid data eye;

recording with the application delivery controller the sequentially introduced delay when the starting edge of the valid data eye is detected and a subsequently introduced delay when the trailing edge of the valid data eye is detected;

determining with the application delivery controller a bit sampling time that provides the timing for the sampling of data in the valid data eye between the sequentially introduced delay and the subsequently introduced delay; and applying the bit sampling time for the sampling of data and establishing the link with the application delivery controller.

2. The method as set forth in claim 1 wherein the bit sampling time comprises a mean of the sequentially introduced delay and the subsequently introduced delay.

3. The method as set forth in claim 1 wherein the bit sampling time is one of greater and less than a mean of the sequentially introduced delay and the subsequently introduced delay.

4. The method as set forth in claim 1 wherein the bit sampling time at a first data rate for the data on the link is used as an initial starting position for determining an updated bit sampling time at a second data rate for the data on the link.

5. The method as set forth in claim 4 wherein the second data rate is higher than the first data rate.

6. The method as set forth in claim 1 wherein the link comprises a Hyper-Transport link.

7. The method as set forth in claim 1 further comprising initially disabling by the application delivery controller transmission of and storing one or more credits to establish the link, wherein the establishing the link further comprises transmitting the one or more stored credits for loading after the bit sampling time is determined.

8. A non-transitory computer readable medium having stored thereon instructions for acquiring data link timing comprising machine executable code which when executed by at least one processor, causes the processor to perform steps comprising:

sequentially introducing a delay and sampling data on a link after each sequentially introduced delay;

determining a starting edge of a valid data eye and a trailing edge of the valid data eye during the sequentially introducing the delay and sampling data, wherein the determining the starting edge and the trailing edge further comprises performing an error calculation cyclic redundancy check on the sampled data to detect the starting edge of the valid data eye and the trailing edge of the valid data eye;

recording the sequentially introduced delay when the starting edge of the valid data eye is detected and a subsequently introduced delay when the trailing edge of the valid data eye is detected;

determining a bit sampling time that provides the timing for the sampling of data in the valid data eye between the sequentially introduced delay and the subsequently introduced delay; and applying the bit sampling time for the sampling of the data and establishing the link.

9. The medium as set forth in claim 8 wherein the bit sampling time comprises a mean of the sequentially introduced delay and the subsequently introduced delay.

10. The medium as set forth in claim 8 wherein the bit sampling time is one of greater and less than a mean of the sequentially introduced delay and the subsequently introduced delay.

11. The medium as set forth in claim 8 wherein the bit sampling time at a first data rate for the data on the link is used as an initial starting position for determining an updated bit sampling time at a second data rate for the data on the link.

12. The medium as set forth in claim 11 wherein the second data rate is higher than the first data rate.

13. The medium as set forth in claim 8 wherein the link comprises a Hyper-Transport link.

14. The medium as set forth in claim 8 further comprising initially disabling transmission of and storing one or more credits to establish the link, wherein the establishing the link further comprises transmitting the one or more stored credits for loading after the bit sampling time is determined.

15. A Hyper-Transport timing acquisition system comprising:

a data tap management system in an application delivery controller that sequentially introduces a delay and samples data on a link after each sequentially introduced delay;

a timing acquisition processing system in the application delivery controller that determines a start of a stable region and an end of the stable region during the sequentially introduced delay and the sample of the data by performing an error calculation cyclic redundancy check on the sampled data to detect the start and the end of the stable region, records the sequentially introduced delay when the start of the stable region is detected and a subsequently introduced delay when the end of the stable region is detected, determines an acquired delay that provides the timing for the sampling of data in the stable region between the sequentially introduced delay and the subsequently introduced delay and applies the acquired delay for the sampling of the data and establishes the link with the application delivery controller.

16. The system as set forth in claim 15 wherein the timing acquisition processing system in the application delivery controller determines the acquired delay from a mean of the sequentially introduced delay and the subsequently introduced delay.

17. The system as set forth in claim 15 wherein the timing acquisition processing system in the application delivery controller determines the acquired delay to be one of greater and less than a mean of the sequentially introduced delay and the subsequently introduced delay.

18. The system as set forth in claim 15 wherein the timing acquisition processing system in the application delivery controller uses the acquired delay at a first transmitted frequency for the data on the link as an initial starting position for the data tap for determining an updated acquired delay at a second transmitted frequency for the data on the link.

19. The system as set forth in claim 18 wherein the second transmitted frequency is higher than the first transmitted frequency.

20. The system as set forth in claim 15 wherein the link comprises a Hyper-Transport link.

21. The system as set forth in claim 15 wherein the timing acquisition processing system initially disables transmission of and stores one or more credits to establish the link, wherein the timing acquisition processing system establishes the link by transmitting the one or more stored credits for loading after the acquired delay is determined.

22. An application delivery controller apparatus comprising:

one or more host system processors;

a host system memory coupled to the one or more host system processors;

a network interface unit coupled to the one or more host system processors and the host system memory via at least one bus, at least one of the network interface unit configured to implement and the one or more host system processors configured to execute programmed instructions stored in the host memory system comprising:

sequentially introducing a delay and sampling data on the bus after each sequentially introduced delay;

determining a starting edge of a valid data eye and a trailing edge of the valid data eye during the sequentially introducing the delay and sampling data, wherein the determining the starting edge and the trailing edge further comprises performing an error calculation cyclic redundancy check on the sampled data to detect the starting edge of the valid data eye and the trailing edge of the valid data eye;

recording the sequentially introduced delay when the starting edge of the valid data eye is detected and a subsequently introduced delay when the trailing edge of the valid data eye is detected;

determining a bit sampling time that provides the timing for the sampling of data in the valid data eye between the sequentially introduced delay and the subsequently introduced delay; and applying the bit sampling time for the sampling of the data and establishing data communications over the bus.

23. The apparatus as set forth in claim 22 wherein the bit sampling time comprises a mean of the sequentially introduced delay and the subsequently introduced delay.

24. The apparatus as set forth in claim 22 wherein the bit sampling time is one of greater and less than a mean of the sequentially introduced delay and the subsequently introduced delay.

25. The apparatus as set forth in claim 22 wherein the bit sampling time at a first data rate for the data on the link is used as an initial starting position for determining an updated bit sampling time at a second data rate for the data on the link.

26. The apparatus as set forth in claim 25 wherein the second data rate is higher than the first data rate.

27. The apparatus as set forth in claim 22 wherein the link comprises a Hyper-Transport link.

28. The apparatus as set forth in claim 22 further comprising initially disabling transmission of and storing one or more credits to establish the link, wherein the establishing the link further comprises transmitting the one or more stored credits for loading after the bit sampling time is determined.

* * * * *